Patented July 12, 1938

2,123,733

UNITED STATES PATENT OFFICE 2,123,733

PRODUCTION OF N-VINYL COMPOUNDS

Ernst Keyssner, Ludwigshafen-on-the-Rhine, Germany, assignor to I. G. Farbenindustrie Aktiengesellschaft, Frankfort - on - the - Main, Germany No Drawing. Application July 31, 1936, Serial No. 93,570. In Germany August 17, 1935

2 Claims. (Cl. 260—46)

The present invention relates to improvements in producing N-vinyl compounds.

It is well known that N-vinyl compounds may be prepared by acting acetylene at elevated temperatures on pyrrole or an organic compound containing the pyrrole ring in the presence of a substance having a strongly alkaline reaction or in the presence of alkali metals.

I have found that the addition of acetylene to secondary diarylamines and to pyrrole compounds, i. e. pyrrole or compounds containing the pyrrole ring, with the formation of the corresponding N-vinyl compounds can be particularly strongly accelerated by using as the catalyst an alkali metal or a strongly alkaline reacting alkali metal compound together with metallic zinc or a zinc compound.

As secondary N-diarylamines there may be mentioned diphenylamine, phenyl-para-tolylamine, alpha-alpha'-dinaphthylamine, phenyl-alpha-naphthylamine, para-tolyl - alpha - naphthylamine and N-phenyl-2-aminoanthracene.

As compounds containing the pyrrole ring besides pyrrole itself may be mentioned for example indole, carbazole and naphthocarbazole. The compounds obtainable from the said compounds by the addition of hydrogen or by the introduction of other atoms or atomic groups, such as tetra-hydrocarbazole or isopropylcarbazole, may be employed provided that they still contain a free NH-group.

Suitable strongly alkaline reacting alkali metal compounds are especially potassium and sodium hydroxide and alcoholates; compounds of the same metals with the initial materials, as for example carbazole potassium, diphenylamine potassium and the like, may also be employed and these compounds, which are formed by heating the secondary diarylamines or the pyrrole compounds with caustic alkalies, are included in the term "substances having a strongly alkaline reaction" wherever used in the present disclosure.

As specially suitable forms of zinc or zinc compounds for the purpose of the present invention may be mentioned zinc shavings, zinc dust, zinc oxide, zinc salts, such as the carbonates, phosphates and the sulphide and also alkali metal zincates. The zinc compounds may be added to the reaction mixture as such or precipitated on carriers.

For the reaction a pressure-tight vessel, for example, may be employed into which the acetylene (advantageously under increased pressure) is led, preferably in admixture with inert gases, such as nitrogen, methane or hydrogen. The reaction may also be carried out in a reaction tower, the operation being in stages or continuous. In this case, the acetylene is preferably led through the tower in a cycle. The high activity of the new catalysts renders possible in a specially advantageous manner the preparation of N-vinyl compounds by a continuous process.

The reaction may be carried out in the presence of diluents, such as alcohols, as for example methyl, ethyl or butyl alcohol, glycols, as for example ethylene glycol or diethylene glycol, or hydrocarbons, as for example cyclohexane, benzene, toluene, tetra-hydronaphthalene or deca-hydronaphthalene. Solid compounds, such as carbazole, are preferably made into a paste with a diluent of the said kind or with the corresponding vinyl compound which melts at a much lower temperature than the initial material. The reaction proceeds above 100° C. most favorably between 100° and 250° C.

The vinyl compounds obtained may be separated from the reaction mixture and purified by distillation, if desired under reduced pressure, or by extraction with suitable solvents or by crystallization.

The following examples will further illustrate how the present invention may be carried out in practice, but the invention is not restricted to these examples. The parts are by weight.

Example 1

A pressure-tight vessel is charged with 50 parts of sublimed carbazole, 50 parts of cyclohexane, 2 parts of potassium hydroxide and 1 part of zinc dust. After flushing out the air with nitrogen, closing the vessel and forcing in nitrogen until the pressure is 3 atmospheres the mixture is heated to 180° C. and acetylene is forced in while shaking until the pressure amounts to from 20 to 25 atmospheres. The absorption of acetylene commences immediately. As soon as the pressure has fallen by about 5 atmospheres, fresh acetylene is pressed in. After 1½ hours, the amount of acetylene absorbed is 8.5 parts. The vinyl carbazole formed is separated in a pure form from the reaction mixture by crystallization or distillation. If the reaction be carried out without the addition of zinc dust under otherwise identical conditions, only 8.5 parts of acetylene are absorbed after 8½ hours. The crude solution in this case is darker in color than when employing zinc dust.

Example 2

50 parts of carbazole and 50 parts of cyclohexane are treated at 180° C. with acetylene in the presence of 2 parts of potassium hydroxide and 1 part of zinc oxide in the manner described in Example 1. The absorption of acetylene ceases after 1½ hours. The amount of acetylene absorbed is 7.8 parts. The cyclohexane solution is washed with water, dried and filtered. After evaporating the cyclohexane, 54 parts of vinyl carbazole are obtained.

Example 3

A mixture of 50 parts of carbazole, 50 parts of hexahydroxylene, 3 parts of potassium hydroxide and 1 part of zinc sulphide is treated at 180° C. with acetylene in the manner described in Example 1. The absorption of acetylene ceases after about 1½ hours, 8 parts of acetylene then having been absorbed. Pure vinyl carbazole is obtained from the reaction mixture by washing it with water and distilling it.

What I claim is:—

1. In the process of producing N-vinyl carbazole by reacting acetylene at a temperature above 100° C. with carbazole, the step which comprises using as a catalyst a substance selected from the group consisting of the alkali metals and strongly alkaline reacting alkali metal compounds and a substance selected from the group consisting of zinc and zinc compounds.

2. In the process of producing N-vinyl carbazole by reacting acetylene in the presence of an inert organic diluent at a temperature above 100° C. with carbazole, the step which comprises using as a catalyst potassium hydroxide and zinc sulphide and an organic diluent.

ERNST KEYSSNER.